(12) United States Patent
Pollack

(10) Patent No.: US 8,814,220 B2
(45) Date of Patent: Aug. 26, 2014

(54) HIGH PRESSURE FLUID SWIVEL COMPRISING A MULTI SEAL PRESSURE REGULATION SYSTEM

(75) Inventor: Jack Pollack, Houston, TX (US)

(73) Assignee: Single Buoy Moorings Inc., Marly (CH)

( * ) Notice: Subject to any disclaimer, the term of this patent is extended or adjusted under 35 U.S.C. 154(b) by 581 days.

(21) Appl. No.: 13/125,470

(22) PCT Filed: Oct. 21, 2009

(86) PCT No.: PCT/EP2009/063823
§ 371 (c)(1),
(2), (4) Date: Jun. 7, 2011

(87) PCT Pub. No.: WO2010/046404
PCT Pub. Date: Apr. 29, 2010

(65) Prior Publication Data
US 2011/0254264 A1   Oct. 20, 2011

(30) Foreign Application Priority Data
Oct. 22, 2008   (EP) .................................... 08167301

(51) Int. Cl.
*F16L 27/08*   (2006.01)
(52) U.S. Cl.
USPC ........... 285/95; 285/121.6; 285/281; 285/351
(58) Field of Classification Search
USPC .......... 285/95, 98, 121.6, 272, 281–282, 351, 285/900
See application file for complete search history.

(56) References Cited

U.S. PATENT DOCUMENTS

| | | | |
|---|---|---|---|
| 2,293,585 A | | 8/1942 | Bard |
| 3,237,220 A | * | 3/1966 | Brandt ............................... 441/5 |
| 4,647,076 A | | 3/1987 | Pollack et al. |
| 4,650,225 A | * | 3/1987 | Le et al. ......................... 285/348 |
| 4,781,404 A | * | 11/1988 | Tharp et al. ..................... 285/94 |
| 4,828,292 A | * | 5/1989 | Jansen ............................. 285/93 |
| 4,925,219 A | * | 5/1990 | Pollack et al. .................. 285/95 |
| 5,697,732 A | * | 12/1997 | Sigmundstad ................ 405/169 |
| 6,161,834 A | * | 12/2000 | Pollack et al. ................ 277/300 |
| 6,450,546 B1 | * | 9/2002 | Montgomery et al. ......... 285/95 |
| 6,581,976 B1 | * | 6/2003 | Pollack et al. .................. 285/98 |
| 2002/0043800 A1 | * | 4/2002 | Montgomery et al. ......... 285/95 |
| 2008/0203724 A1 | * | 8/2008 | Odegaard ........................ 285/95 |

FOREIGN PATENT DOCUMENTS

| | | |
|---|---|---|
| GB | 2 306 672 A | 5/1997 |
| WO | 03/095885 A1 | 11/2003 |

OTHER PUBLICATIONS

International Search Report, dated Mar. 16, 2010, from corresponding PCT application.

* cited by examiner

*Primary Examiner* — Aaron Dunwoody
*Assistant Examiner* — Fannie Kee
(74) *Attorney, Agent, or Firm* — Young & Thompson

(57) ABSTRACT

A pressure regulation system for a high pressure swivel comprises an annular inner wall and an annular outer wall, mutually rotatable around an axis, defining a toroidal chamber, and a gap extending axially between the walls from the chamber to an outer part. Positioned in the gap are an isolation seal, an isolation gap section, a primary seal, a primary gap section and a secondary seal. A first pressure control unit is connected to the chamber and to a pressurization device coupled to the isolation gap section for supplying fluid to the isolation gap section from the pressurization device.

14 Claims, 5 Drawing Sheets

US 8,814,220 B2

HIGH PRESSURE FLUID SWIVEL COMPRISING A MULTI SEAL PRESSURE REGULATION SYSTEM

BACKGROUND OF THE INVENTION

1. Field of the Invention

The invention relates to a high pressure swivel comprising an annular inner wall and an annular outer wall, rotatable relative to one another around an axis, the walls defining a toroidal chamber, an axial gap extending between the walls from the chamber to an outer part, the gap comprising seen in axial direction, toward the outer part:
- an isolation seal situated in the gap adjacent the chamber,
- an isolation gap section extending downstream from the isolation seal,
- a primary seal situated in the gap,
- a primary gap section situated downstream from the primary seal, and
- a secondary seal situated downstream from the primary seal.

2. Description of Related Art

High pressure swivels, used at pressures between 100 and 400 bar are known from U.S. Pat. No. 4,647,076.

Such swivels having multiple flow paths use in-line and toroidal couplings to convey fluids from a substantially fixed part to a rotating part. Commonly such swivels are used in the production of hydrocarbons on weathervaning, ship-shaped, floating production systems where flow lines transfer fluids between the floating unit and the seabed. To avoid the twisting of flow lines as the vessel weathervanes they are connected to a turret about which the vessel rotates. The swivel is located in the flow path between the fixed turret and the rotating vessel.

To allow for the swivel rotation, bearings and seals are used. The seals in these swivels are often made of synthetic elastomeric or plastic low friction materials that generally slide on smooth, closely machined, hard metallic surfaces. The properties of these seals and their ability to seal across the gap formed at the interface between the fixed and rotating swivel parts is well-known. The swivel designs take care that these swivel gaps, referred to as "extrusion gaps", stay within the proven limits of the particular type of seal used in the design. These extrusion gaps limits for seal materials are known to vary with both temperature and pressure.

SUMMARY OF THE INVENTION

Offshore floating production has slowly advanced into ever deeper waters where large quantities of oil remain to be found. Due to depth, the reservoirs found in these deeper waters tend to have higher pressures and temperatures, such as 600 bar and 130 C that start to exceed the ability of the known sealing materials to seal the extrusion gaps that can be achieved in these swivels. It is an object of the present invention to provide a means by which existing and future sealing technology can be extended to seal higher pressure and temperature fluids.

It is a further object of the present invention to provide a reliable swivel seal which can operate at relatively high pressures and temperatures. Hereto a swivel in accordance with the invention comprises a first pressure control unit being connected to the chamber and to pressurization means that are coupled to the isolation gap section for supplying fluid to the isolation gap section from the pressurization means when the pressure in the chamber rises and for venting fluid from the isolation gap section when the pressure in the chamber drops to maintain the pressure in the isolation gap at a substantially constant pressure above the chamber pressure.

By regulating the pressure in primary gap section, and limiting said pressure to specific boundaries via the pressure control unit, the primary seal lifetime can be increased. Regulating the pressure the primary seal is exposed to can be further accomplished by stepping the pressure over an additional secondary seal.

The method for going to higher pressures by stepping the pressure over more than one seal has generally been known as it has been disclosed in U.S. Pat. No. 4,647,076 which is incorporated herein by reference.

U.S. Pat. No. 4,647,076 discloses a high pressure face seal swivel having a balanced pressure isolation system. By balanced pressure isolation refers to the pressure across the isolation system being zero or balanced. In this design the isolation seal acts as a barrier between the product and isolation fluid. This isolation works fine with liquids and solids however experience showed gas to migrate across the isolation seals causing the isolation liquid to be lost and the pressure (primary) seal to be working in gas, which would cause it to degrade. To solve this gas problem an overpressure isolation system was designed. This overpressure stops the gas from migrating across the seal and keeps the pressure (primary) seal working in contact with the isolation fluid and prolongs its life.

There are several options for this isolation system design, the main ones being a static system and a dynamic system. The static system simply creates a constant larger than design pressure in the isolation cavity by having a constant pressure supply. As the swivel expands and contracts due to pressure or temperature changes the isolation oil is simply supplied or vented from the cavity. As the isolation cavity is closed by the isolation and primary seal the isolation fluid if not vented would create large overpressure to occur when the cavity is reducing in volume due to a pressure reduction in the product flow. To avoid this type of overpressure the isolation cavity is normally vented by another pressure controlled device, which simply dumps the isolation liquid in a slop tank. One could allow the liquid to return to the supply, however as over time there could be impurities present in the isolation cavity it is not wise to recycle this liquid. The dynamic isolation system is one that has a pressure regulated fill valve that continually will keep a certain minimum differential overpressure between the product pressure and isolation system. This system also has a pressure regulated vent valve that always vents isolation liquid at a maximum differential pressure larger than the product pressure and isolation system. There is a differential pressure between the fill and vent valve settings where neither valves will open. For a swivel having the product pressure shared by more than one seal the static isolation system would not be used.

When there is more than one pressure seal sharing some part of the total swivel product pressure there is a volume created between the primary and secondary seal that needs to be regulated to keep some liquid in it at the correct pressure. The liquid due to its own physical properties will change in volume due to pressure and temperature. The swivel will also change its internal volume due to pressure and temperature. The pressure at the primary seal will be determined by the pressure of the dynamic isolation system (if used) or directly by the pressure in the toroidal chamber of the swivel. A pressure sensing valve, which could simply be a check valve as mentioned in U.S. Pat. No. 4,647,076, could be used to limit the pressure of the primary seal and supply the over pressure to the secondary seal. The cavity between the primary and secondary seal would then go to the secondary sealing pressure. When the pressure reduces in the swivel the secondary cavity volume will decrease and this liquid pressure would thus increase unless it can be vented outside the swivel by a pressure sensing valve or flow across the back of the primary seal into the isolation cavity (if used) or into the product path. It is not desirable to have pressure and flow across the back of a pressure seal but a check valve could be used to vent this secondary cavity.

It is known that swivels and sealing areas tend to have small particles of debris either left over from their manufacture or from seal wear particles that agglomerate within the swivel sealing cavities. Valves capable of operating at the pressures in these swivels tend to have small delicate seats that leak when they foul with debris. To prevent this type of fouling very fine filters are be introduced in front of these valves to prevent this fouling. To enable these valves and filters to be maintained they are put into accessible locations where they can be isolated by valves to cater for their removal for change out or maintenance.

The idea is to limit the pressure of a single seal to be equal to or less than its known limits by putting another seal in series with it to take the overpressure. The first or primary seal then works in a higher pressure environment but is limited to the differential pressure it resists. It is known that the seal's pressure resistance capability is primarily determined by differential pressure not its surrounding pressure.

The pressure regulation of two or more seals incrementally sharing the overall pressure of a flowing fluid in a swivel must deal with a number of issues, which cause complications. Broadly these are caused by contaminants and by pressure variation in the fluid being sealed.

Contaminants are generally dealt with by placing an overpressured, sealed liquid isolation system between the fluid and the primary pressure seal. This isolation system is contained between the isolation seal and primary seal as shown in the attached figures. The primary seal will therefore see the pressure of the regulated isolation system, which operates much as in existing swivels.

The use of two seals to incrementally take the pressure will require the pressure between the primary and secondary seal keep the primary seal differential pressure below a design limit. The pressure of the cavity or volume formed between these seals is regulated by pressure sensing means which open and close valves to cause seal compatible fluids to flow in and out so as to keep the primary seal differential pressure below a set value.

For instance in an intact high pressure swivel as shown in FIG. 4, when the toroid pressure Pf is increasing the swivel body will deform so as to increase the volume in all the swivel cavities. The cavity between the primary and secondary will thus increase in volume causing a decrease in pressure here unless a sensing means signals a higher external pressure device to pump higher pressure fluid into this cavity. The sensing device also needs to be set to recognize when to stop pumping so as not to overpressure the isolation cavity pressure and also not to cause too large a pressure for the secondary seal.

In the instance of a decreasing toroid pressure Pf the swivel cavities will be decreasing in volume and the fluid between primary and secondary seal needs to be vented so as not to cause an overpressure on the secondary seal. To accomplish this a second sensing system needs to be available to allow this venting to take place without decreasing the pressure to a level where the primary seal pressure exceeds its design pressure Pd. This is generally accomplished by having the vent system operate at some $\delta P$ above the fill system pressure.

In one embodiment a second pressure control unit is connected to the pressurization means and to the primary gap section for when the pressure in the chamber is below a predetermined threshold value: supplying fluid to the primary gap section when the pressure in the chamber rises and for venting when the pressure in the chamber drops, and when the pressure in the chamber is above a predetermined threshold value: maintaining a substantially constant pressure in the primary gap section.

By limiting the prevailing pressures at the secondary seal, its lifetime can be extended. The second pressure control unit is adapted to supply fluid to the primary gap section when the pressure in the chamber rises and to venting when the pressure in the chamber drops, when the pressure in the chamber is below a predetermined threshold value. When the pressure in the chamber is above a predetermined threshold value the second pressure control unit maintains a substantially constant pressure in the primary gap section. In this way the differential pressures over the primary and secondary seals are limited to this threshold pressure, which threshold pressure may for instance lie in the range of 400-500 bar for a chamber pressure of 800-1000 bar.

BRIEF DESCRIPTION OF THE DRAWINGS

Some embodiments of a high pressure swivel will, by way of non limiting example, be discussed in detail with reference to the accompanying drawings. In the drawings.

DETAILED DESCRIPTION

Figure 1:
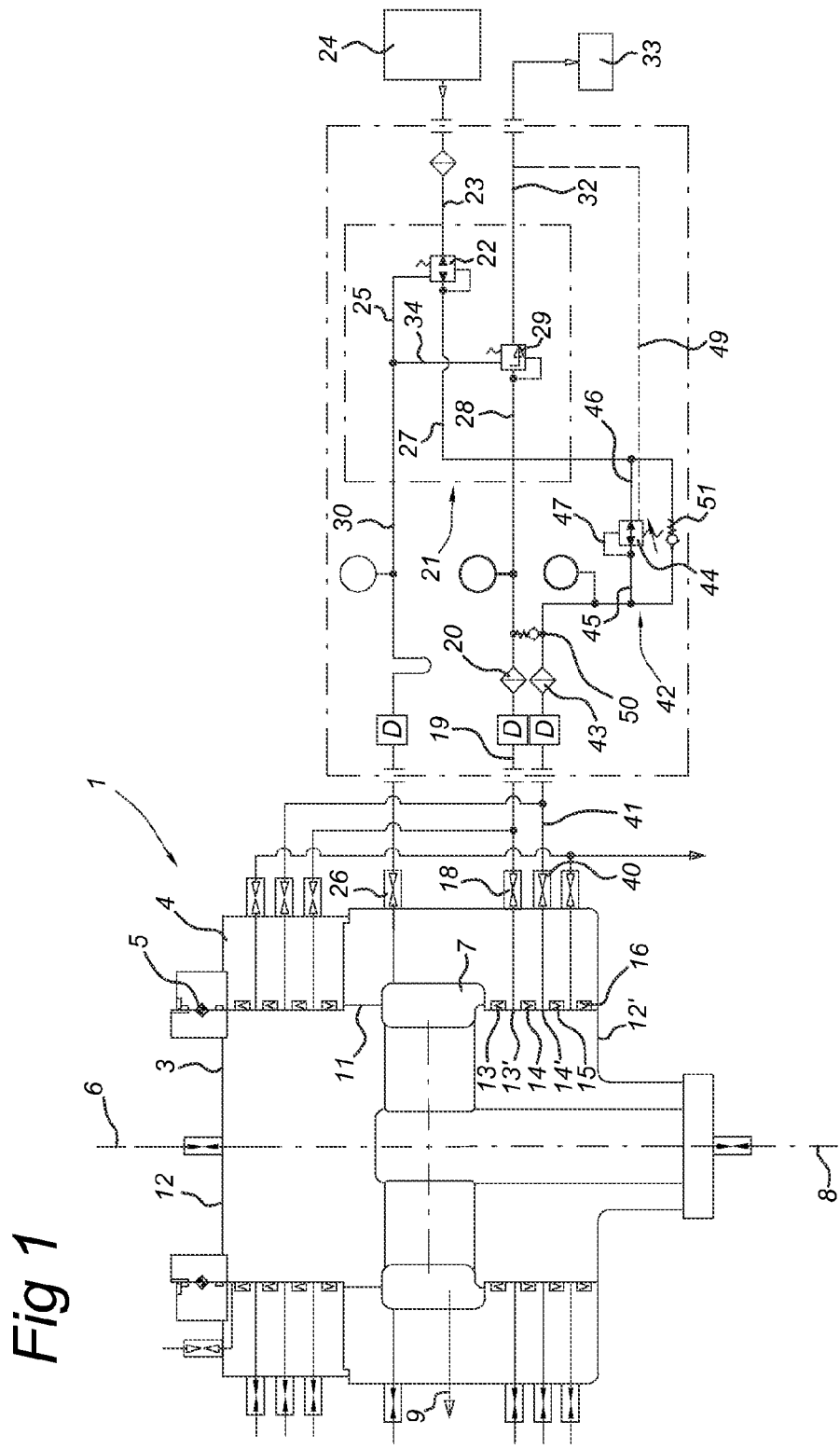
FIG. 1 shows a schematic view of a high-pressure swivel with pressure control means according to the present invention.

FIG. 1 shows a high pressure swivel 1 having an inner annular wall 3 and an outer annular wall 4. The outer wall is rotatably supported on the inner wall via a bearing structure schematically indicated at 5, which can be an axial-radial bearing. The outer and inner walls 3, 4 are coaxial with a central axis 6 around which the outer wall 4 can rotate. A toroidal chamber 7 is defined between the walls 3, 4 with an inlet duct 8 via which fluids, in particular high pressure and high temperature hydrocarbons (e.g. oil at a pressure of over 100 bar and over 90° C.) are supplied into the chamber 7 from a geostationary riser duct extending to a subsea hydrocarbon well. From the toroidal chamber 7, the hydrocarbons are supplied to a duct, schematically indicated at 9 on the vessel which is connected to storage or process equipment.

At the interface of the walls 3,4 an axial gap 11 extends from the toroidal chamber 7 to the outer surface 12, 12' of the swivel 1. The outer surface 12, 12' may for instance be at atmospheric pressure. In the gap 11 an isolation seal 13, a primary seal 14, a secondary seal 15 and a tertiary seal 16 are provided. An isolation gap section 13' downstream of the isolation seal 13, is connected via a normally-open valve 18 to a duct 19 that via filter 20 connects to a first pressure control unit 21. The pressure control unit 21 comprises a pressure regulator 22 that is connected with an input duct 23 to a high pressure source 24. A control input 25 of the pressure regulator 22 is connected to the chamber 7 via pressure duct 30 and valve 26. The output duct 27 of the pressure regulator 22 is connected to the duct 19 of the isolation gap section 13'. The pressure duct 19 of the isolation gap section 13' also connects to an input 28 of a pressure relief valve 29 of the first pressure control unit 21. The output duct 32 of the pressure relief valve 29 connects to a leak collection tank 33. The control input 34 of the relief valve 29 connects to the pressure duct 30.

A primary gap section 14' of the gap 11, downstream of the primary seal 14, is connected to a duct 41 via normally open valve 40. The duct 41 connects via a filter 43 to second pressure control unit 42. The control unit 42 comprises a pressure regulator 44 connected with its output 45 to duct 41, and connected with a pressure input 46 to output duct 27 of the pressure regulator 22. A venting duct 49 of pressure regulator 44 is connected to leak collection tank 33.

The pressure in the chamber 7 may for example be about 830 bar, whereas the pressure of the high pressure source 24 is at 870 bar. The pressure regulator 22 is adjusted to provide a substantially constant positive pressure differential of about 20-25 bar relative to the pressure in the chamber 7, so that the isolation seal 13 at the isolation gap section 13' is at a pressure of about 855 bar. The threshold level of the pressure relief valve 29 is for instance set at 30 bar, so that when the pressure at the isolation gap section 13' rises above the pressure in the chamber 7 by 30 bar (e.g. to 860 bar, for instance due to swivel deformation caused by temperature or pressure fluctuations), the fluid is vented from the isolation gap section 13' through the output duct 32 to the leak collection tank 33.

The pressure regulator 44 of the second pressure control unit 42 controlling the pressure of the primary seal 14 at primary gap section 14', is set at a pressure level of for instance 450 bar. The control input 47 of the pressure regulator 44 is connected to the primary gap section 14'. The pressure at the primary gap section 14' increases with the pressure of the chamber 7 until a threshold pressure of 430 bar, at which threshold pressure the regulator 44 closes and the primary gap section 14' is maintained at this threshold pressure upon further increase of the pressure in the chamber 7.

Figure 2:
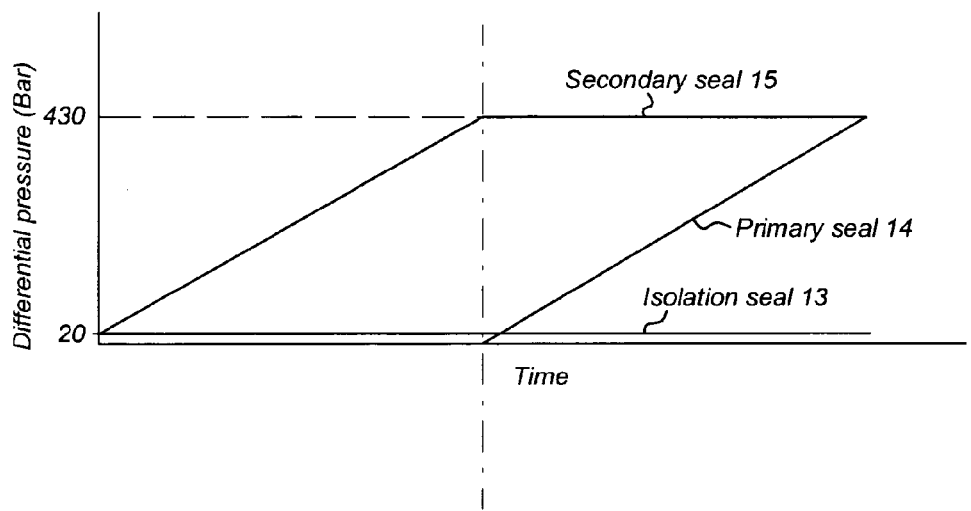
FIG. 2 shows a graph of the pressures in the chamber, the isolation gap section and the primary gap section.

The pressures of the chamber 7, at isolation gap section 13' and at the primary gap section 14' are shown in FIG. 2. The pressure of the isolation gap section 13' follows the pressure in the chamber 7 at a constant positive pressure differential of 25 bar. The pressure of the primary gap section 14' follows the pressure of the chamber 7 up to the threshold pressure of 430 bar and remains at 430 bar at further increase of the chamber pressure.

Figure 3:
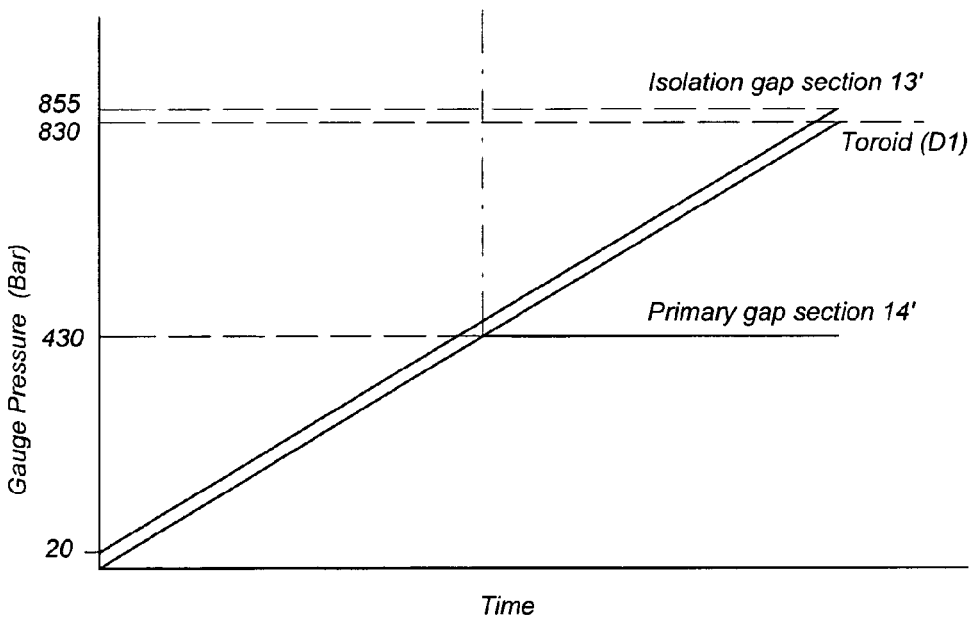
FIG. 3 shows a graph of the differential pressure at the isolation seal, the primary seal and the secondary seal.

In FIG. 3, the differential pressures relative to the pressure in the toroidal chamber 7, across the isolation seal 13, the primary seal 14 and the secondary seal 15 are shown. The pressure control systems 21, 42 limit the differential pressures across the primary and secondary seals 14,15 to a maximum of 430 bar.

In case of failure of the primary seal 14, the overpressure in duct 41 is relieved via check valves 50, 51.

Figure 4:
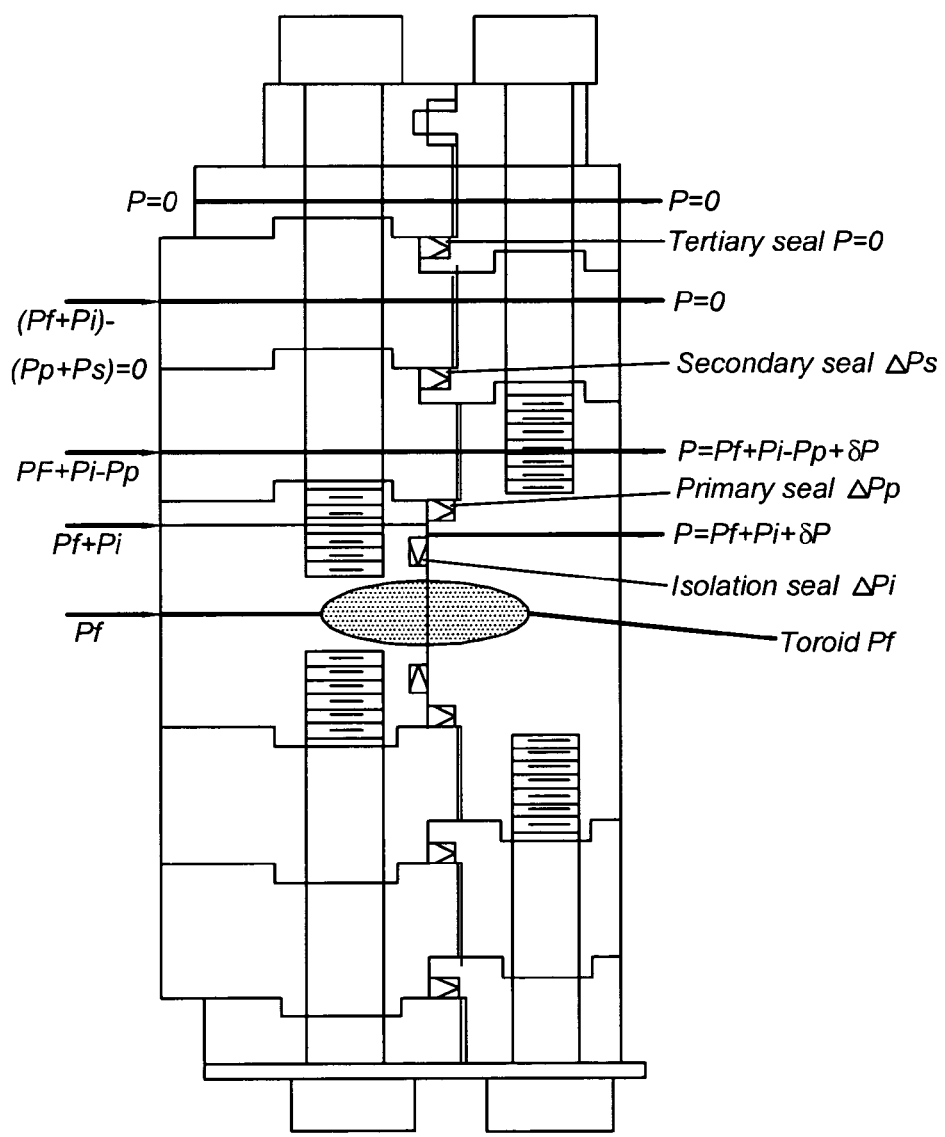
FIG. 4 shows a schematic indication of the operating pressures of a high pressure swivel of the present invention having intact primary and secondary seals.
Figure 5:
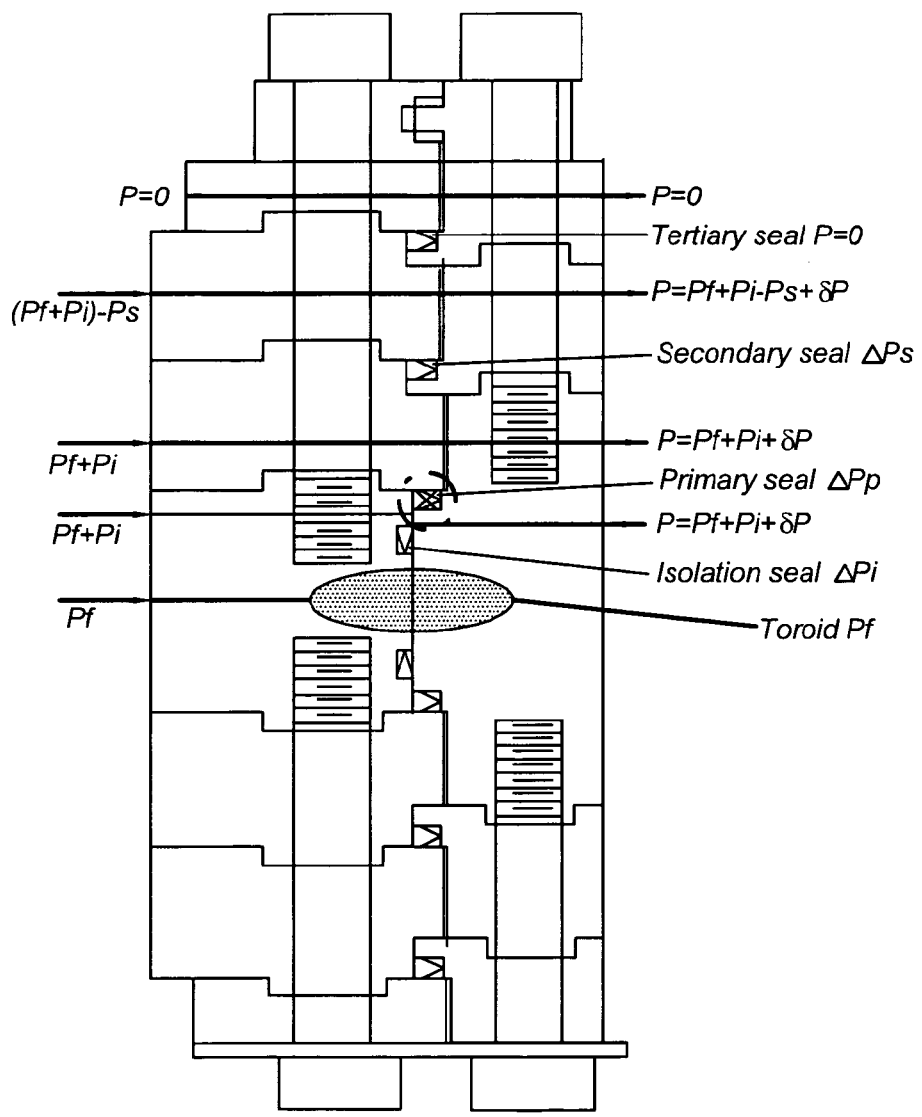
FIG. 5 shows a schematic indication of the operating pressures of a high pressure swivel of the present invention having a damaged primary seal.
Figure 6:
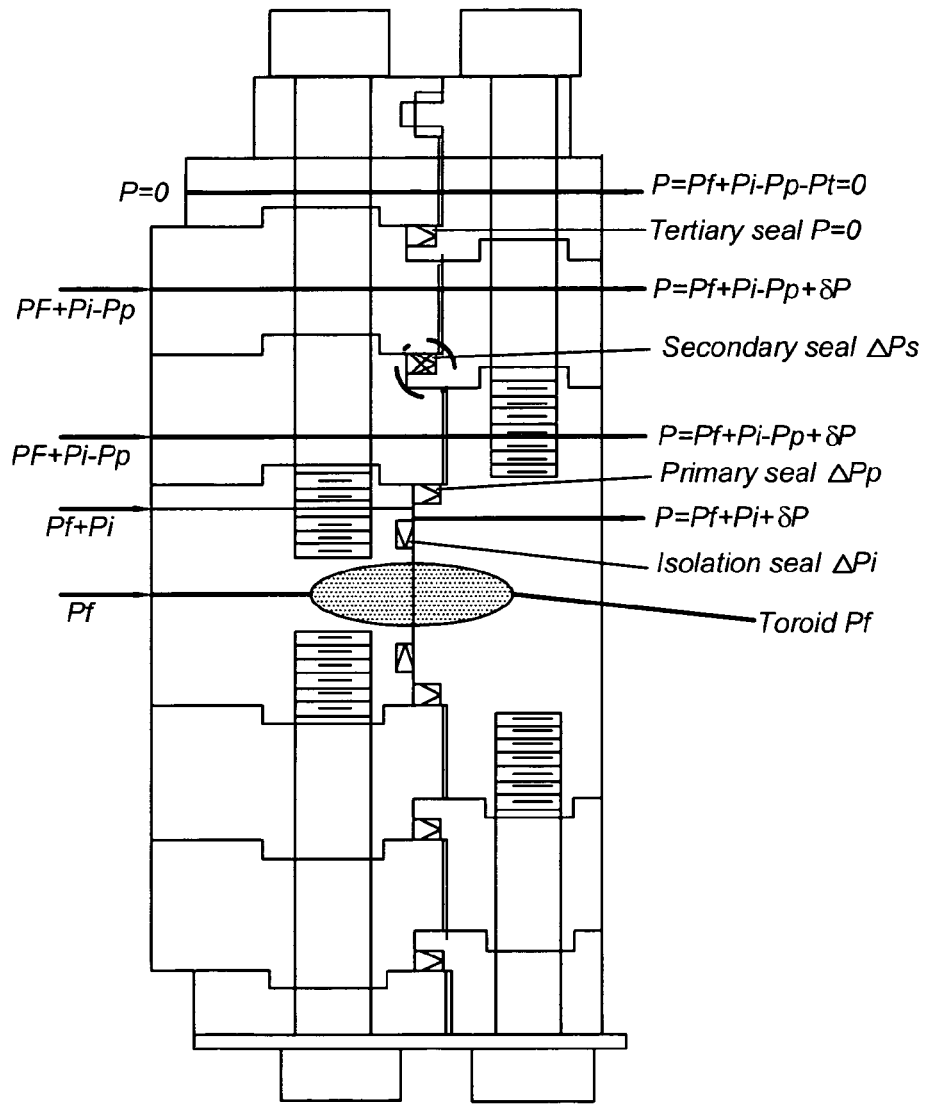
FIG. 6 shows a schematic indication of the operating pressures of a high pressure swivel of the present invention having a damaged secondary seal.

FIGS. 4-6 show a sample VHP (Very High Pressure) swivel. The swivel shown has an isolation seal and 3 pressure seals. Normal swivels typically only have 2 pressure seals. Since the VHP swivel contains the pressure over two pressure seals it would not be safe to operate as the failure of either seal would cause the other seal to fail and damage and injury would result. To make this swivel safe a $3^{rd}$ tertiary seal is added that will ensure the pressure loss of one seal does not cause a swivel containment loss.

FIGS. 5 and 6 show the condition of the VHP swivel in the event either the primary or secondary seal is lost. Should these conditions occur the sensing systems will react to these failures and change the cavity fill and vent systems to bring the swivel to the condition shown in these figures. Malfunctions in these sensing systems will be prevented from causing outflows by using flow fuses in the vent systems to shut in any abnormal flow.

The invention claimed is:

1. Pressure regulation system for a high pressure swivel, comprising
    an annular inner wall and an annular outer wall, rotatable relative to one another around an axis defining an axial direction, the walls defining a toroidal chamber,
    the walls further defining a gap extending axially between the walls from the toroidal chamber to an outer part of the high pressure swivel, wherein the system further comprises, positioned in the gap in axial succession along a flow direction from the toroidal chamber to the outer part:
    an isolation seal adjacent the toroidal chamber,
    an isolation gap section,
    a primary seal,
    a primary gap section, and
    a secondary seal,
    a first pressure control unit being connected to the toroidal chamber and to a pressurization device coupled to the isolation gap section and being configured to supply fluid to the isolation gap section from the pressurization device when a pressure in the toroidal chamber rises and to vent fluid from the isolation gap section when the pressure in the chamber drops, thereby to maintain a pressure in the isolation gap section at a substantially constant value above a pressure in the toroidal chamber.

2. The system according to claim 1, wherein a second pressure control unit is connected to the pressurization device and to the primary gap section and is configured, when the pressure in the toroidal chamber is below a predetermined threshold value, to supply fluid to the primary gap section when the pressure in the chamber rises and to vent when the pressure in the chamber drops; and, when the pressure in the chamber is above a predetermined threshold value, to maintain a substantially constant pressure in the primary gap section.

3. The system according to claim 2, wherein the threshold pressure is between 0.25 and 0.75 of the chamber pressure.

4. The system according to claim 3, wherein the threshold pressure is about half the chamber pressure.

5. The system according to claim 2, wherein the second pressure control unit comprises a pressure regulator connected with an input to the isolation gap section, with an output to the primary gap section and with a control input to the primary gap section.

6. The system according to claim 2, wherein a tertiary seal is positioned in the gap, axially downstream of the secondary seal.

7. The system according to claim 1, wherein a tertiary seal is positioned in the gap, downstream of the secondary seal.

8. The system according to claim 1, wherein a pressure at the isolation gap section is between 10 and 100 bar above a pressure in the toroidal chamber.

9. The system according to claim 8, wherein the pressure at the isolation gap section is about 50 bar above the chamber pressure.

10. The system according to claim 8, wherein the pressure at the isolation gap section is about 25 bar above the chamber pressure.

11. The system according to claim 1, wherein a pressure in the toroidal chamber is between 500 bar and 5000 bar.

12. The system according to claim 11, wherein the chamber pressure is about 1000 bar.

13. The system according to claim 1, wherein the first pressure control unit comprises a pressure regulator connected with a control input to the toroidal chamber and with a supply input to a high pressure source, an output of the pressure regulator being connected to the isolation gap section.

14. The system according to claim 13, the first pressure control unit further comprising a relief valve having a control input connected to the toroidal chamber, an input connected to the isolation gap section and an output connected to a fluid collection unit.

* * * * *